US010313321B2

United States Patent
Wong

(10) Patent No.: US 10,313,321 B2
(45) Date of Patent: Jun. 4, 2019

(54) TOKENIZATION OF CO-NETWORK ACCOUNTS

(71) Applicant: Visa International Service Association, San Francisco, CA (US)

(72) Inventor: Erick Wong, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 175 days.

(21) Appl. No.: 15/093,656

(22) Filed: Apr. 7, 2016

(65) Prior Publication Data

US 2017/0295155 A1    Oct. 12, 2017

(51) Int. Cl.
- *G06F 7/04* (2006.01)
- *G06F 15/16* (2006.01)
- *H04L 29/06* (2006.01)
- *H04L 29/08* (2006.01)

(52) U.S. Cl.
CPC ............ *H04L 63/08* (2013.01); *H04L 63/102* (2013.01); *H04L 67/306* (2013.01)

(58) Field of Classification Search
CPC combination set(s) only.
See application file for complete search history.

(56) References Cited

U.S. PATENT DOCUMENTS

| | | |
|---|---|---|
| 5,613,012 A | 3/1997 | Hoffman |
| 5,781,438 A | 7/1998 | Lee |
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |

(Continued)

FOREIGN PATENT DOCUMENTS

| | | |
|---|---|---|
| EP | 2156397 A1 | 2/2010 |
| WO | 2001035304 A1 | 5/2001 |

(Continued)

OTHER PUBLICATIONS

Chipman, et al., U.S. Appl. No. 15/265,282 (Unpublished), Self-Cleaning Token Vault, filed Sep. 14, 2016.

(Continued)

*Primary Examiner* — Phy Anh T Vu
(74) *Attorney, Agent, or Firm* — Kilpatrick Townsend & Stockton LLP

(57) ABSTRACT

The present disclosure relates generally to tokenization of a co-network account. A co-network account, as used herein, refers to an account associated with a first transaction processing network for processing transactions initiated using the account and a second transaction processing network for processing transactions initiated using the account. During provisioning of a co-network account onto a user device, a first token is generated for use with the first transaction processing network and a second token is generated for use with the second transaction processing network. Embodiments use the authentication result generated during the provisioning of the first token for the provisioning of the second token. Embodiments automatically provision multiple payment tokens on the user device upon determining that the account is associated with more than one transaction processing networks (e.g. the account is a co-network account).

15 Claims, 5 Drawing Sheets

(56) References Cited

U.S. PATENT DOCUMENTS

| | | |
|---|---|---|
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B2 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo et al. |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |

(56) References Cited

U.S. PATENT DOCUMENTS

| | | |
|---|---|---|
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,848,052 B2 * | 12/2017 | Kumnick ............... H04L 67/02 |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0310778 A1 * | 12/2009 | Mueller ............. G06Q 20/3823 380/44 |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |

(56) References Cited

U.S. PATENT DOCUMENTS

| | | |
|---|---|---|
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0259782 A1 | 10/2012 | Hammad |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0151400 A1* | 6/2013 | Makhotin .......... G06Q 20/3227 705/39 |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |

(56) References Cited

U.S. PATENT DOCUMENTS

| | | |
|---|---|---|
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0250006 A1* | 9/2014 | Makhotin ............ G06Q 20/3227 705/41 |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1* | 11/2014 | Wong ................... G06Q 20/363 705/71 |
| 2014/0344153 A1* | 11/2014 | Raj ..................... G06Q 20/3821 705/44 |
| 2014/0344154 A1* | 11/2014 | Flurscheim ............ G06Q 20/10 705/44 |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1* | 1/2015 | Dill ..................... G06Q 20/385 705/44 |
| 2015/0046338 A1* | 2/2015 | Laxminarayanan ........................ G06Q 20/38215 705/67 |
| 2015/0046339 A1* | 2/2015 | Wong .................. G06Q 20/382 705/71 |
| 2015/0046340 A1 | 2/2015 | Dimmick |
| 2015/0052064 A1* | 2/2015 | Karpenko ............ G06Q 20/3829 705/71 |
| 2015/0081554 A1* | 3/2015 | Wong ................... G06Q 20/401 705/44 |
| 2015/0088674 A1* | 3/2015 | Flurscheim ........ G06Q 20/3276 705/17 |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1* | 4/2015 | Kumnick ............. G06Q 20/382 705/67 |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1* | 5/2015 | Powell .................... H04W 4/24 455/406 |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1* | 6/2015 | Wong ................... H04L 9/0869 713/172 |
| 2015/0186864 A1 | 7/2015 | Jones et al. |
| 2015/0193222 A1 | 7/2015 | Pirzadeh et al. |
| 2015/0195133 A1* | 7/2015 | Sheets .................. H04W 4/001 709/222 |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0227932 A1* | 8/2015 | Huxham .............. G06Q 20/027 705/76 |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0339664 A1* | 11/2015 | Wong .................... H04L 9/3234 705/71 |
| 2015/0356560 A1 | 12/2015 | Shastry et al. |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0173483 A1* | 6/2016 | Wong .................... H04L 63/083 726/9 |
| 2016/0224976 A1 | 8/2016 | Basu |
| 2016/0248479 A1* | 8/2016 | Bellenger ............ H04B 5/0031 |
| 2016/0267466 A1* | 9/2016 | Kumnick ............. G06Q 20/341 |
| 2016/0283942 A1* | 9/2016 | Chitragar ........... G06Q 20/4016 |
| 2016/0292686 A1* | 10/2016 | Laxminarayanan ........................ G06Q 20/4014 |
| 2016/0302140 A1* | 10/2016 | Shaw .................... H04W 48/20 |
| 2016/0321652 A1* | 11/2016 | Dimmick ............. H04L 63/083 |
| 2016/0358163 A1* | 12/2016 | Kumar ................ G06Q 20/3823 |
| 2017/0017957 A1* | 1/2017 | Radu ................... G06Q 20/3829 |
| 2017/0032362 A1* | 2/2017 | Lahkar ............... G06Q 20/3672 |
| 2017/0046696 A1 | 2/2017 | Powell et al. |
| 2017/0103387 A1 | 4/2017 | Weber |
| 2017/0186007 A1* | 6/2017 | Lam ...................... G06Q 20/34 |
| 2017/0220818 A1 | 8/2017 | Nagasundaram et al. |
| 2017/0221054 A1* | 8/2017 | Flurscheim ........ G06Q 20/3678 |
| 2017/0228723 A1 | 8/2017 | Taylor et al. |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |
| WO | 2014-007516 A1 | 1/2014 |

OTHER PUBLICATIONS

Lopez, et al., U.S. Appl. No. 15/462,658 (Unpublished), Replacing Token on a Multi-Token User Device, filed Mar. 17, 2017.

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Wang, U.S. Appl. No. 62/000,288 (unpublished), Payment System Canonical Address Format, filed May 19, 2014.

Sharma et al., U.S. Appl. No. 62/003,717 (unpublished), Mobile Merchant Application, filed May 28, 2014.

Kalgi et al., U.S. Appl. No. 62/024,426, (unpublished) Secure Transactions Using Mobile Devices, filed Jul. 14, 2014.

Prakash et al., U.S. Appl. No. 62/037,033 (unpublished), Sharing Payment Token, filed Aug. 13, 2014.

Hoverson et al., U.S. Appl. No. 62/038,174 (unpublished), Customized Payment Gateway, filed Aug. 15, 2014.

Wang, U.S. Appl. No. 62/042,050 (unpublished), Payment Device Authentication and Authorization System, filed Aug. 26, 2014.

Gaddam et al., U.S. Appl. No. 62/053,736 (unpublished), Completing Transactions Without a User Payment Device, filed Sep. 22, 2014.

Patterson, U.S. Appl. No. 62/054,346 (unpublished), Mirrored Token Vault, filed Sep. 23, 2014.

Dimmick, U.S. Appl. No. 14/952,514 (unpublished), Systems Communications With Non-Sensitive Identifiers, filed Nov. 25, 2015.

(56) References Cited

OTHER PUBLICATIONS

Dimmick, U.S. Appl. No. 14/952,444 (unpublished), Tokenization Request Via Access Device, filed Nov. 25, 2015.
Prakash et al., U.S. Appl. No. 14/955,716 (unpublished), Provisioning Platform for Machine-To-Machine Devices, filed Dec. 1, 2015.
Wong et al., U.S. Appl. No. 14/966,948 (unpublished), Automated Access Data Provisioning, filed Dec. 11, 2015.
Stubbs et al., U.S. Appl. No. 62/103,522 (unpublished), Methods and Systems for Wallet Provider Provisioning, filed Jan. 14, 2015.
McGuire, U.S. Appl. No. 14/600,523 (unpublished), Secure Payment Processing Using Authorization Request, filed Jan. 20, 2015.
Flurscheim et al., U.S. Appl. No. 15/004,705 (unpublished), Cloud-Based Transactions With Magnetic Secure Transmission, filed Jan. 22, 2016.
Flurscheim et al., U.S. Appl. No. 62/108,403 (unpublished), Wearables With NFC HCE, filed Jan. 27, 2015.
Sabba et al., U.S. Appl. No. 15/011,366 (unpublished), Token Check Offline, filed Jan. 29, 2016.
Patterson, U.S. Appl. No. 15/019,157 (unpublished), Token Processing Utilizing Multiple Authorizations, filed Feb. 9, 2016.
Cash et al., U.S. Appl. No. 15/041,495 (unpublished), Peer Forward Authorization of Digital Requests, filed Feb. 11, 2016.
Le Saint et al., U.S. Appl. No. 15/008,388 (unpublished), Methods for Secure Credential Provisioning, filed Jan. 27, 2016.
Kinagi, U.S. Appl. No. 62/117,291 (unpublished), Token and Cryptogram Using Transaction Specific Information, filed Feb. 17, 2015.
Galland et al. U.S. Appl. No. 62/128,709 (unpublished), Tokenizing Transaction Amounts, filed Mar. 5, 2015.
Rangarajan et al., U.S. Appl. No. 61/751,763 (unpublished), Payments Bridge, filed Jan. 11, 2013.
Li, U.S. Appl. No. 61/894,749 (unpublished), Methods and Systems for Authentication and Issuance of Tokens in a Secure Environment, filed Oct. 23, 2013.
Aissi et al., U.S. Appl. No. 61/738,832 (unpublished), Management of Sensitive Data, filed Dec. 18, 2012.
Wong et al., U.S. Appl. No. 61/879,362 (unpublished), Systems and Methods for Managing Mobile Cardholder Verification Methods, filed Sep. 18, 2013.
Powell, U.S. Appl. No. 61/892,407 (unpublished), Issuer Over-The-Air Update Method and System, filed Oct. 17, 2013.
Powell, U.S. Appl. No. 61/926,236 (unpublished), Methods and Systems for Provisioning Mobile Devices With Payment Credentials and Payment Token Identifiers, filed Jan. 10, 2014.
International Search Report and the Written Opinion of the International Searching Authority, PCT Application No. PCT/US2016/026527, dated Dec. 21, 2016, 12 pages.

* cited by examiner

TOKENIZATION OF CO-NETWORK ACCOUNTS

BACKGROUND

User devices (e.g. mobile communication devices, tablets, laptops, etc.) are used more and more to conduct transactions using user accounts. A user account may be provisioned on the user device thereby allowing the user device to initiate transactions (e.g. payment transactions) with transacting entities.

A user account may be associated with a transaction processing network. During provisioning of the account on the user device, the transaction processing network may perform an identification and verification process to ensure that the user requesting the account provisioning is the rightful user of the account. For example, the transaction processing network may send a security question to the user and receive an answer from the user. Accordingly, the user interaction is often required during provisioning of user accounts for improved security.

There exist accounts that are associated with more than one transaction processing networks. During provisioning of such accounts on a user device, all transaction processing networks associated with the account need to be identified so that each transaction processing network may perform their own identification and verification process. Thus, provisioning of such accounts may be burdensome on the user.

Embodiments of the invention address these and other problems, individually and collectively.

SUMMARY

The present disclosure relates generally to tokenization of a co-network account. A co-network account, as used herein, refers to an account that can be used in connection with transactions processed by multiple transaction processing networks. For example, a co-network account may be associated with a first transaction processing network (e.g. Visa) and a second transaction processing network (e.g. Interac) for processing transactions initiated using the co-network account. When the user (e.g. account holder of the co-network account) wishes to provision the co-network account onto his user device (e.g. mobile communication device) with tokenized information, the user needs two tokens: a first token associated with the first transaction processing network and a second token associated with the second transaction processing network. Embodiments provision the second token, after provisioning the first token, without requesting the user to re-authenticate themselves for the provisioning of the second token. That is, embodiments use the authentication result generated during the provisioning of the first token for the provisioning of the second token. Embodiments automatically provision multiple payment tokens on a user device upon determining that the account is associated with more than one transaction processing networks (e.g. the account is a co-network account).

Embodiments provide a method comprising receiving, at a server computer of a first transaction processing network, a token provisioning request message from a token requestor. The token provisioning request message includes an account identifier. In some embodiments, an account identified by the account identifier is a co-network account. The method further includes determining, by the server computer, a second transaction processing network associated with the account identifier. The method also includes performing, by the server computer, an authentication process with a user based on determining the second transaction processing network associated with the account identifier. The method further includes generating, by the server computer, a first token associated with the account identifier and sending, by the server computer, the first token and result of the authentication process to the token requestor. The token requestor requests a second token for the account identifier from the second transaction processing network associated with the account identifier. In some embodiments, the first token and the second token are provisioned on a user device of the user.

According to various embodiments, the method includes informing the token requestor of the second transaction processing network upon determining the second transaction processing network. The method may also include sending a provisioning request message to an authorizing computer to request authorization prior to generating the first token. The provisioning request message may include the account identifier and the result of the authentication process. In some embodiments, the method may include determining, prior to generating the first token, that an account identified by the account identifier is eligible for provisioning.

In some embodiments, a method is provided including sending, by a token requestor computer, a first token request message to a first transaction processing network. The first token request message may include an account identifier. The method may also include receiving, by the token requestor computer, a message from the first transaction processing network indicating that the account identifier is associated with a second transaction processing network. The method may further include receiving, by the token requestor computer, a first token from the first transaction processing network. The method may also include sending, by the token requestor computer, a second token request message to the second transaction network, and receiving, by the token requestor computer, a second token from the second transaction processing network. According to various embodiments, the first token and the second token may be provisioned on a user device of a user of an account identified by the account identifier.

In some embodiments, the second token request message may include the account identifier and the first token. The method may also include receiving, by the token requestor computer, result of an authentication process performed by the first transaction processing network. The second token request message may include the account identifier and the result of the authentication process performed by the first transaction processing network. The method may also include receiving, by the token requestor computer, the account identifier from a user of an account associated with the account identifier prior to sending the first token request message.

Embodiments may also provide a system including one or more processors; and a non-transitory computer readable storage medium communicatively coupled with the one or more processors. The readable storage medium comprises code, executable by the one or more processors, to implement the above-described methods.

The foregoing, together with other features and embodiments will become more apparent upon referring to the following specification, claims, and accompanying drawings.

DETAILED DESCRIPTION

Figure 1:
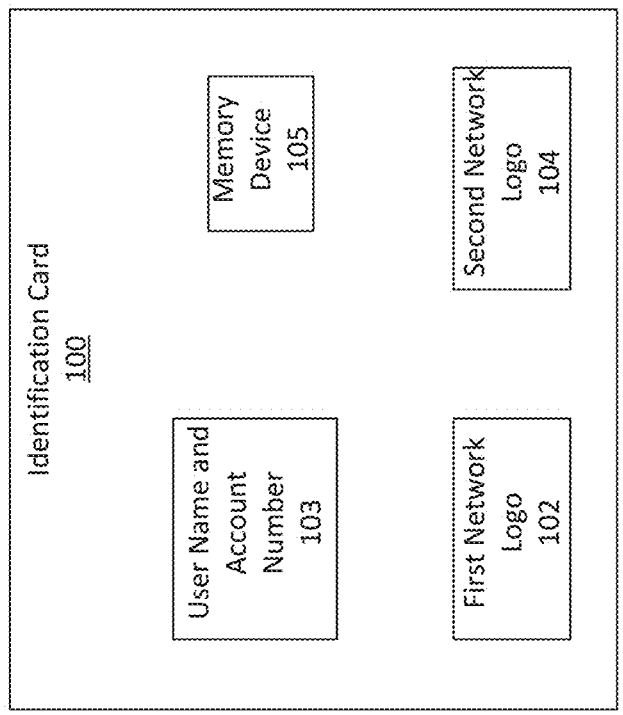
FIG. 1 illustrates an exemplary co-network identification card associated with a co-network account, according to some embodiments of the invention.

In the following description, for the purposes of explanation, specific details are set forth in order to provide a thorough understanding of embodiments of the invention. However, it will be apparent that various embodiments may be practiced without these specific details. For example, circuits, systems, algorithms, structures, techniques, networks, processes, and other components may be shown as components in block diagram form in order not to obscure the embodiments in unnecessary detail.

It is to be understood that embodiments of the invention may include more or fewer than the components shown individually in a diagram. The figures and description are not intended to be restrictive.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The present disclosure relates generally to tokenization of a co-network account. A co-network account, as used herein, refers to an account that can be used in connection with transactions processed by multiple networks. For example, a co-network account may be associated with a first transaction processing network (e.g. VISA) and a second transaction processing network (e.g. Interac) for processing transactions initiated using the co-network account. When the user (e.g. account holder of the co-network account) wishes to provision the co-network account onto his user device (e.g. mobile communication device), the user needs two tokens: a first token associated with the first transaction processing network and a second token associated with the second transaction processing network. Embodiments provision the second token, after provisioning the first token, without requesting the user to re-authenticate themselves during the provisioning of the second token. That is, embodiments use the authentication result generated during the provisioning of the first token for the provisioning of the second token. Embodiments automatically provision multiple payment tokens on the user's mobile communication device upon determining that the account is associated with more than one transaction processing networks (e.g. the account is a co-network account).

Although many of the specific examples relate to tokens for payments, it is understood that embodiments of the invention can be used where any two transaction processing networks are used. For example, a corporation may operate an authorizing computer system, and may operate different networks that can allow access to different locations of the corporation (e.g., a building in Texas and a building in California). The locations may require respectively different tokens to access the systems, and these tokens may be based on a single real employee account identifier. Tokens for these different locations may be provisioned to a user device in a similar manner as described below with respect to tokens that are used with financial transactions.

In yet other embodiments, tokens may be used to access certain types of data from different data providers (e.g., credit agencies, governmental agencies, etc.). Tokens for these different data providers may be provisioned to a user device in a similar manner as described below with respect to tokens that are used with financial transactions.

Before discussing specific embodiments and examples, some descriptions of terms used herein are provided below.

A "server computer" may typically be a powerful computer or cluster of computers. For example, the server computer can be a large mainframe, a minicomputer cluster, or a group of servers functioning as a unit. In one example, a server computer may be a database server coupled to a Web server. A server computer may also be a cloud based or non-cloud based server implementation. Data transfer and other communications between components such as computers may occur via any suitable wired or wireless network, such as the Internet or private networks.

An "account holder" may hold an account. An "account holder" may include an individual or an entity that uses a system. An account holder may be associated with one or more accounts and/or user devices. In some cases, the account holder may also be referred to as a user or a consumer.

An "authorizing entity" (e.g. an issuer) can include an entity that authorizes a request. In some embodiments, an authorizing entity is an issuer that issues an account. The account (which may be associated with one or more user devices) may refer to any suitable account including payment accounts (e.g. a credit card account, a checking account, a savings account, a merchant account assigned to a consumer, a prepaid account, etc.), an employment account, an online account (e.g. email account, database subscription account, etc.).

An "issuer" may typically refer to a business entity (e.g., a bank) that maintains financial accounts for a user and often issues a credit or debit card to the user. An issuer can include a payment account issuer. The issuer may be responsible to make a credit limit available to account holders and may also be responsible for sending payments to merchants for purchases made with payment accounts issued by the issuer. The issuer may authorize a requested load amount to be uploaded to a user device. The issuer may operate an "authorization computer" to perform the foregoing actions.

A "transacting party" is an entity that conducts a transaction. It can be an entity that engages in transactions and can sell goods or services, or provides access to goods or services. For example, a transacting party may include a merchant.

A "transaction processing network" may refer to a computer or a network of computers that processes transactions. In some embodiments, the transaction processing network can be in an electronic system used to accept, transmit, or process transactions made by user devices for money, goods, services or access to locations or data. The transaction processing network may transfer information and funds among issuers, acquirers, transacting parties, and users. An example of the transaction processing network may include a payment processing server computer such as VisaNet™, operated by Visa®. Payment processing server computers such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. In other embodiments, a transaction processing network can be a collection of computers that can allow access to a person seeking to access a particular location. In yet other embodiments, a transaction processing network can be a collection of computers that can allow access to specific types of data (e.g., governmental agencies).

A "user device" may refer to any device that may be used to conduct a financial transaction, such as to provide payment information to a merchant. A user device may be in any suitable form. For example, suitable user devices may be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of user devices include cellular phones, personal digital assistants (PDAs), pagers, payment cards, security cards, access cards, smart media, transponders, 2-D barcodes, an electronic or digital wallet, wearable devices such as smart watches, fitness bands, ankle bracelets, rings, earrings, and the like. If the user device is in the form of a debit, credit, or smartcard, the user device may also optionally have features such as magnetic stripes. Such devices can operate in either a contact or contactless mode. In some embodiments, the user device may include a mobile device comprising any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. In some embodiments, the user device may include a stand-alone computer for conducting e-commerce transactions. Yet it other embodiments, the user device may include a vehicle, such as a car or a motorcycle having a processor and a memory storing payment information of the user.

A "token" may be a substitute for credential information. In some embodiments, a token may include an identifier for a payment account that is a substitute for an account identifier, such as a primary account number (PAN). For example, a token may include a series of numeric and/or alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "token service provider" may refer to an entity including one or more server computers that generates, processes and maintains tokens. The token service provider may include or be in communication with a token vault where the generated tokens are stored. Specifically, the token vault may maintain one-to-one mapping between a token and a primary account number (PAN) represented by the token.

A "token vault" may refer to a repository that maintains established token-to-PAN mappings. According to various embodiments, the token vault may also maintain other attributes of a token requester that may be determined at the time of registration and that may be used by the token service provider to apply domain restrictions or other controls during transaction processing. In some embodiments, the token vault may be provided as a part of the token service provider. Alternatively, the token vault may be a remote repository accessible by the token service provider. The token vault, due to the sensitive nature of the data mappings that are stored and managed in it, may be protected by strong underlying physical and logical security.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other-information which may be replaced with a substitute value (i.e., token). Tokenization may be used to enhance transaction efficiency, improve transaction security, increase service transparency, or to provide a method for third-party enablement.

A "co-network account" may refer to an account that is associated with (e.g. that can be used in connection with transactions processed by) two or more transaction processing networks. A co-network account may be associated with a co-network card, such as a co-network debit card.

FIG. 1 illustrates an exemplary co-network identification card 100 associated with a co-network account, according to some embodiments of the invention. The co-network identification card 100 may be used to conduct transactions such as payment transactions to purchase goods or services, or access transactions to gain access to physical locations (e.g. a building) or to gain access to data stored at a virtual location (e.g. database supervised by a government agency). The co-network identification card 100 may show/display the user name and the account number 103. The co-network identification card 100 may also include a memory device 105, such as a memory chip, that may be used to store data and/or to conduct contactless transactions. The exemplary co-network identification card 100 illustrated in FIG. 1 may have access to a first transaction processing network (e.g. the Interac network) and a second transaction processing network (e.g. the VISA network) for payments that come from the co-network account. Both the logo 102 of the first transaction processing network and the logo 104 of the second transaction processing network may be displayed on the front of the co-network identification card 100. While payments come directly from the co-network account, the transactions may take place over the first transaction processing network or the second transaction processing network depending on the type of transaction or dependent on user's selection.

Figure 2:
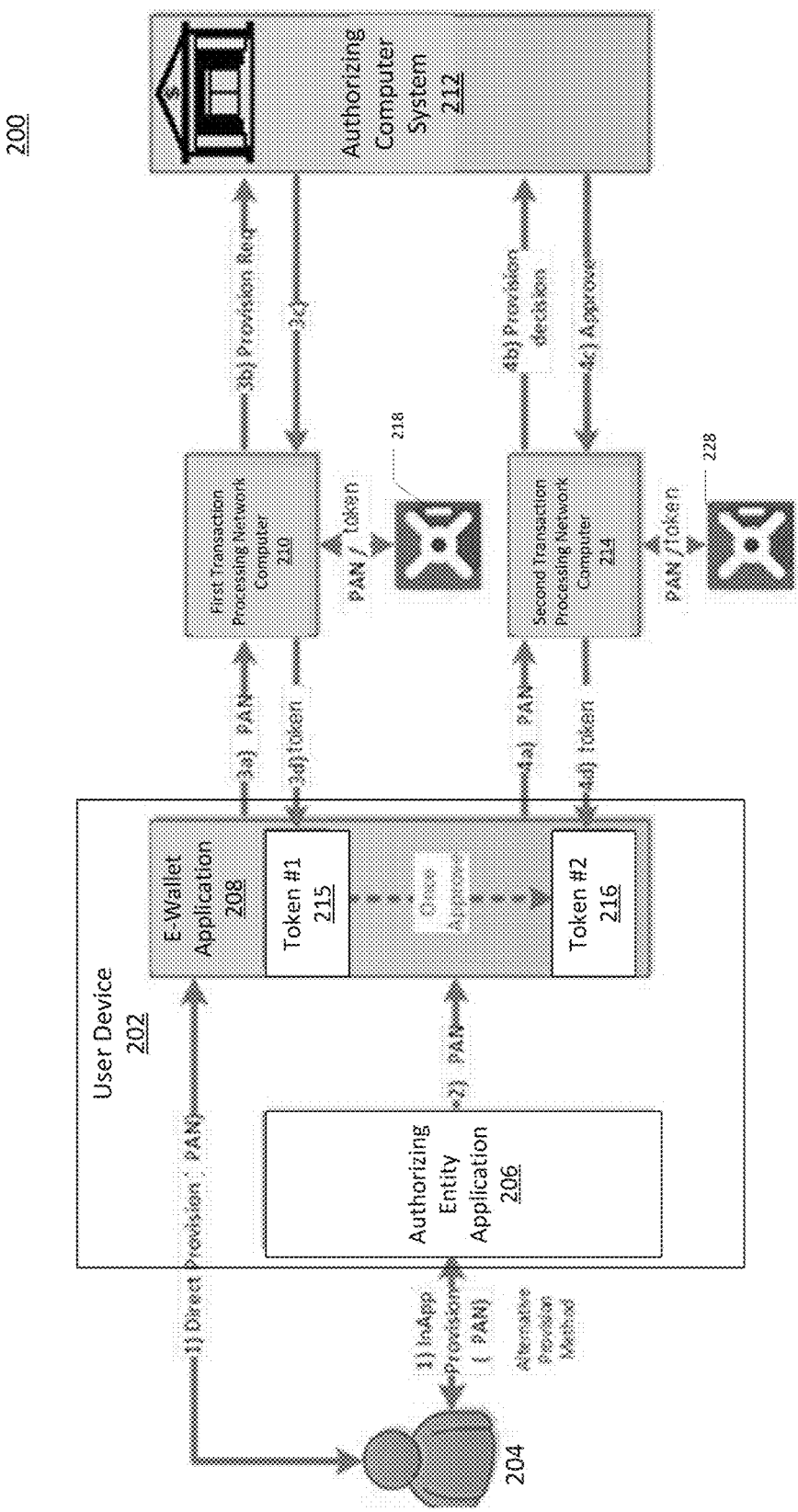
FIG. 2 illustrates a transaction processing environment that manages provisioning of a co-network account on a user device, according to some embodiments of the present invention.

FIG. 2 illustrates a transaction processing environment 200 that manages provisioning of a co-network account on a user device 202, according to some embodiments of the present invention. FIG. 2 illustrates functional elements of a transaction processing environment according to one embodiment of the present invention. It is to be understood that embodiments of the invention may include more than one of the components shown individually in FIG. 2. Additionally, some embodiments of the invention may include fewer than all of the components shown in FIG. 2.

Transaction processing environment 200 may include an account holder 204, a user device 202 storing an application 206 provided by an authorizing entity and an application provided by an e-wallet provider (e.g. e-wallet application) 208, a first transaction processing network computer 210, a second transaction processing network computer 214, and an authorizing computer system 212 associated with an authorizing entity. The various computer systems may be configured to communicate in any suitable manner using any suitable communication network. Although the entities are shown as coupled to particular entities, the entities may be configured to communicate through any other suitable interfaces and some entities may be removed and/or added to the system depending on the configuration of the system.

The first transaction processing network computer 210 and the second transaction processing network computer 214 can include, respectively, data processing subsystems, networks, and operations used to support and deliver authorization services, exception file services, and clearing and settlement services. For example, the first transaction processing network computer 210 or the second transaction processing network computer 214 can comprise a server computer and databases of information.

In some embodiments, the first transaction processing network computer 210 or the second transaction processing network computer 214 can be implemented as a payment processing network. An exemplary payment processing network may include, for example, VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The first transaction processing network computer 210 or the second transaction processing network computer 214 can use any suitable wired or wireless network, including the Internet. Among other functions, the first transaction processing network computer 210 or the second transaction processing network computer 214 may be responsible for ensuring that a user is authorized to conduct a transaction (via an authentication process), confirm the identity of a party to a transaction (e.g., via receipt of a personal identification number), confirm a sufficient balance or credit line to permit a purchase, or reconcile the amount of a purchase with the consumer's account (via entering a record of the transaction amount, date, etc.).

The first transaction processing network computer 210 and/or the second transaction processing network computer 214 may also function as a token service provider. That is, the first transaction processing network computer 210 and/or the second transaction processing network computer 214 may include one or more server computers that generates, processes and maintains tokens. The first transaction processing network computer 210 and/or the second transaction processing network computer 214 may include or be in communication with a token vault 218, 228 where the generated tokens are stored. Specifically, the token vault may maintain one-to-one mapping between a token and a primary account number (PAN) represented by the token.

In some embodiments, the user (e.g. the account holder) 204 may have a co-network account that the user wishes to provision on the user device 202. The user 204 may send the provisioning request using the authorizing entity application 206 or the e-wallet application 208 stored on the user device by providing an account identifier (e.g. a primary account number (PAN)) for the co-network account to either one of these applications (step 1). If the user 204 providers the account identifier to the authorizing entity application 206 (e.g. the user logs in to the authorizing entity application 206 and enters the account identifier using the physical or virtual keypad of the user device 202), the authorizing entity application 206 may then pass the account identifier to the e-wallet application 208 (step 2). Once the e-wallet application receives the account identifier from either the user 204 or the authorizing entity application 206, the e-wallet application 208 generates and transmits a first provisioning request to the first transaction processing network computer 210 (step 3a). The provisioning request may also be referred as a token request, as the account is provisioned on the user device using a token.

The first transaction processing network computer 210 may analyze the request to retrieve the account identifier. Once the first transaction processing network computer 210 retrieves the account identifier, the first transaction processing network computer 210 may determine (1) whether the account identifier can be tokenized, and (2) whether the account identifier is associated with a co-network account. For example, the first transaction processing network computer 210 may determine a second transaction processing network computer 214 associated with the account identifier. For example, the first transaction processing network computer 210 may query a database or an issuer of the account to determine that the account identifier is associated with a co-network account and/or that the second transaction processing network computer 214 is associated with the account identifier. In some embodiments, the first transaction processing network computer 210 may notify the e-wallet application 208 that the account identifier is associated with another transaction processing network (e.g. with the second transaction processing network computer 214).

The first transaction processing network computer 210 may initiate an authentication process with the user 204 to ensure that the user 204 is the authorized user of the account identified by the account identifier provided in the first provisioning request. For example, the first transaction processing network computer 210 may perform one or more of identification and verification (ID&V) methods with the user 204. Examples of ID&V methods may include, but are not limited to, an account verification message, a risk score based on assessment of the primary account number (PAN) and use of one time password by the issuer or its agent to verify the account holder. Exemplary ID&V methods may be performed using information such as a user signature, a password, an offline or online personal identification number (PIN), an offline or online enciphered PIN, a combination of offline PIN and signature, a combination of offline enciphered PIN and signature, user biometrics (e.g. voice recognition, fingerprint matching, etc.), a pattern, a glyph, knowledge-based challenge-responses, hardware tokens (multiple solution options), one time passwords (OTPs) with limited use, software tokens, two-channel authentication processes (e.g., via phone), etc.

Upon successful completion of the authentication process, the first transaction processing network computer 210 may send the first provisioning request to the authorizing computer system 212 (step 3b). In some embodiments, the first transaction processing network computer 210 may also send the result of the authentication process to the authorizing computer system 212. The authorizing computer system 212 may approve the tokenization of the account identified by the account identifier provided in the first provisioning request. The authorizing computer system 212 may return the provisioning decision (e.g. the provisioning authorization) to the first transaction processing network computer 210 (step 3c).

The first transaction processing network computer 210 may interact with a first token vault 218 to generate and store a first token 215 associated with the account identifier provided in the first provisioning request. The first transaction processing network computer 210 may store a mapping between the first token 215 and the account identifier in the first token vault 218. The first transaction processing network computer 210 may then transmit the first token 215 to the e-wallet application 208 (step 3d). The e-wallet application 208 may store the first token 215 at a secure storage of the user device 202 that is accessible by the e-wallet application 208. Accordingly, the first token 215 may be provisioned on the user device 202. In some embodiments, the first transaction processing network computer 210 may also provide the authentication process to the e-wallet application 208.

As explained above, the e-wallet application 208 is notified by the first transaction processing network computer 210 that the account identifier is also associated with the second transaction processing network computer 214. Thus, when the first token 215 is successfully provisioned on the user device 202 and/or is activated upon use, the e-wallet application 208 may automatically generate and transmit a second provisioning request to the second transaction processing network computer 214 (step 4a). The second provisioning request may include the account identifier (e.g. the same identifier provided in the first provisioning request). In some embodiments, the second provisioning request may also include the result of the authentication process performed by the first transaction processing network computer 210 and provided to the e-wallet application 208. The second provisioning request may also include an indication that a token (i.e. the first token 215) has already been generated for this account. In embodiments where the result of the authentication process performed by the first transaction processing network is provided to the second transaction processing network, the second transaction processing network may verify the result of the authentication process to ensure that the received data is indeed a valid result of the authentication process from the first processing network. The verification may be performed by the second transaction processing network or by the issuers enabled by the second transaction processing network.

The second transaction processing network computer 214 may transmit the second provisioning request to the authorizing computer system 212 (step 4b). The second provisioning request may include one or more of the account identifier, the result of the authentication performed by the first transaction processing network computer 210, an indicator that a token has been previously authorized and generated for this account, etc. In some embodiments, the authorizing computer system 212 may independently determine whether the authorizing computer system 212 has already approved provisioning of the account identified by the account identifier. If the authorizing computer system 212 determines that it already approved the provisioning of the account, the authorizing computer system 212 may return the provisioning decision (e.g. the provisioning authorization) to the second transaction processing network computer 214 (step 4c). In other embodiments, the authorizing computer 212 may approve the provisioning of the account via the second transaction processing network computer 214 based on the information provided in the second provisioning request. The authorizing computer system 212 may return the provisioning decision (e.g. the provisioning authorization) to the second transaction processing network computer 214 (step 4c).

The second transaction processing network computer 214 may interact with a second token vault 228 to generate and store a second token 216 associated with the account identifier provided in the second provisioning request. The second transaction processing network computer 214 may store a mapping between the second token 216 and the account identifier in the second token vault 228. The second transaction processing network computer 214 may then transmit the second token 216 to the e-wallet application 208 (step 4d). The e-wallet application 208 may store the second token 216 at a secure storage of the user device 202 that is accessible by the e-wallet application 208. Accordingly, the second token 216 may be provisioned on the user device 202.

Figure 3:
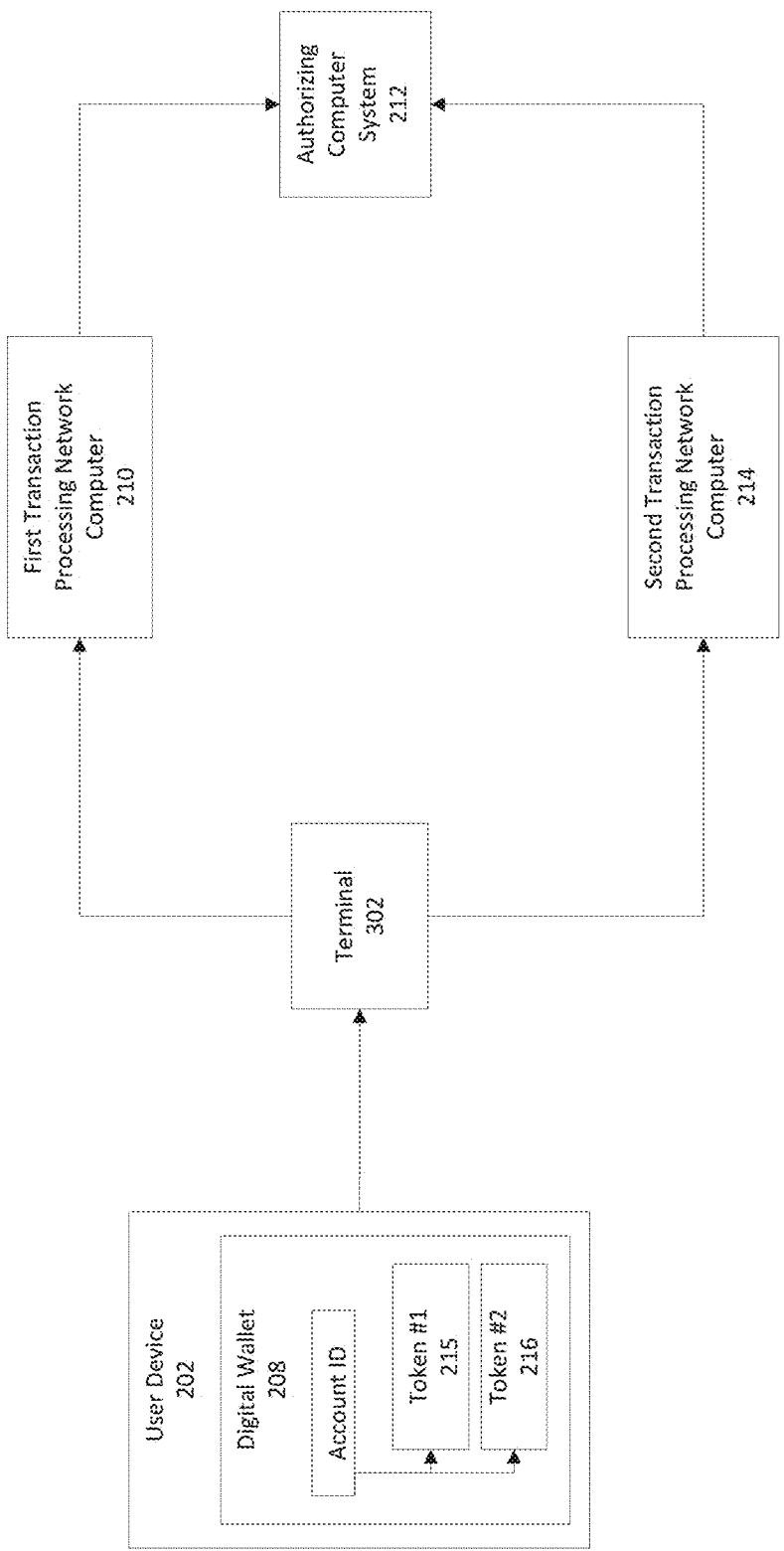
FIG. 3 illustrates an transaction using one of the multiple tokens associated with a co-network account provisioned on a user device, according to various embodiments.

FIG. 3 illustrates an transaction using one of the multiple tokens associated with a co-network account provisioned on a user device, according to various embodiments. In the exemplary transaction illustrated in FIG. 3, the user 204 may initiate a transaction using the user device 202 at a terminal 302. For example, the transaction may be for the purchase of a good or a service at a terminal (e.g. a point of sale (POS) device) of a transacting entity (e.g. a merchant) or the transaction may be to withdraw/transfer money from the co-network account of the user 204 at a banking terminal (e.g. ATM). The transaction may be initiated when the user 204 presents his or her user device 202 to the terminal 302. The user 204 may be asked to choose one of the tokens 212, 216 that are stored on the user device 202. For example, when the user 204 places the user device 202 at the proximity of the terminal 302, a screen prompt may be displayed on the user device 202 requiring the user 204 to select one of the first token 215 or the second token 216 associated with the co-network account. Alternatively, the user 204 may select one of the first token 215 or the second token 216 associated with the co-network account prior to placing the user device 202 at the proximity of the terminal 302 to initiate the transaction. For example, the user 204 may select the first token 215 for the exemplary transaction.

Depending on the token received at the terminal 302, the transacting entity (e.g. merchant, ATM owner, bank, etc.) associated with the terminal 302 may determine the transaction processing network (e.g. the first transaction processing network 210 or the second transaction processing network 214) associated with the received token. In the exemplary transaction discussed above, the transacting entity may determine that the transaction should be processed by the first transaction processing network computer 210 upon receiving the first token 215. The transacting entity associated with the terminal 302 may transmit transaction information (e.g. the received token, description of the goods or services included in the transaction, transaction amount, etc.). in an authorization request message to the first transaction processing network 210.

An authorization request message may be protected using a secure encryption method (e.g., 128-bit SSL or equivalent) in order to prevent data from being compromised. In one embodiment, the authorization request message is a standardized interchange message such as an International Organization for Standardization (ISO) 8583 message. An ISO 8583 message includes a message type indicator; one or more bitmaps indicating which data elements are present in the message, and data elements of the message. The authorization request message may comprise routing information as part of or in addition to the interchange message. As part of generating the authorization request message, the transacting entity may communicate with a database which stores data such as data regarding the account owner, the payment device, or the account owner's transaction history with the transacting entity.

The first transaction processing network 210 may receive the authorization request message and may exchange the received token (e.g. the first token 215) with the corresponding identifier (e.g. account number) associated with the co-network account. The first transaction processing network 210 may then determine an authorizing entity capable of authorizing transactions initiated using the co-network account of the account holder 204. For example, the authorizing entity may be the issuer of the co-network account of the account holder 204. The first transaction processing network 210 may then forward the authorization request message to the authorizing computer system 212 for authorization of the transaction. Any number of additional processes including fraud analysis, authentication, risk analysis, and/or other actions may be performed by the first transaction processing network 210 (or any of the other computers associated with the authorization request message).

The authorizing computer system 212 receives the authorization request message and determines whether the transaction should be authorized. The authorizing computer system 212 may determine the account associated with the authorization request message, compare an account value or credit available in the account to the transaction amount, perform any number of fraud checks or risk analysis processes, and/or perform any other relevant actions to determine an appropriate authorization decision.

The authorizing computer system 212 may determine an authorization decision approving or declining the transaction and may generate an authorization response message including the authorization decision. The authorizing computer system 212 may send the authorization response message to the first transaction processing network 210 for completion and processing of the transaction.

The first transaction processing network 210 may receive the authorization response message, log the authorization decision for settlement and clearance purposes, and send the authorization response message to the transacting entity terminal 302. The transacting entity terminal 302 (associated with a transacting entity computer system) receives the authorization response message and completes the transaction based on the authorization decision of the authorization response message. For example, the transacting entity may provide a good or service to the user 204 if the authorization response message includes an indication of an accepted transaction and may decline to provide a good or service to the user 204 if the authorization response message includes an indication of a declined transaction.

Figure 4:
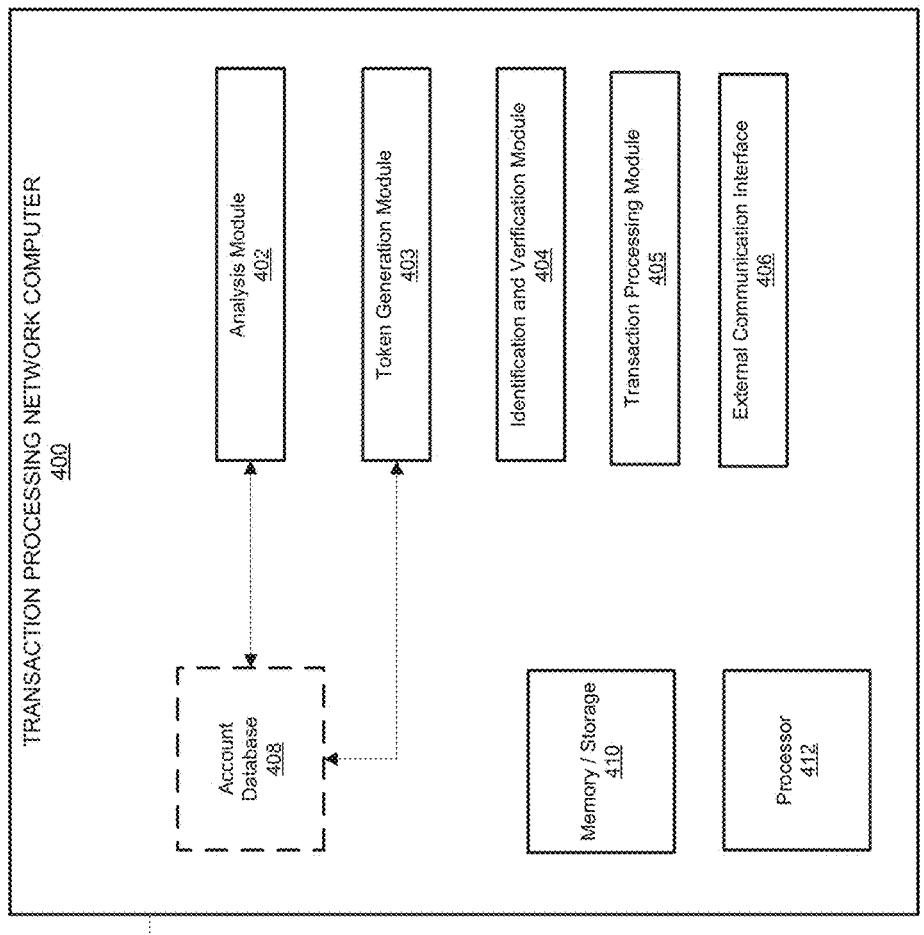
FIG. 4 a block diagram of an exemplary transaction processing network computer, in accordance with some embodiments of the invention.

FIG. 4 illustrates the components of an exemplary transaction processing network computer 400 according to an embodiment of the invention. The transaction processing network computer 400 may include an analysis module 402, a token generation module 403, an identification and verification module 404, a transaction processing module 405, an external communication interface 406, an account database 408, a memory/storage 410 and a processor 412.

The account database 408 may store information associated with user accounts. For example, an account identifier (e.g. account number), a token corresponding to the account identifier, user identifying information (e.g. user name, address, alias, social security number, etc.), security codes, etc. associated with an account may be stored in connection with that account on the database 408. Even though the account database 408 is illustrated as a part of the transaction processing network computer 400 in FIG. 4, one of ordinary skill in the art will appreciate that the account database 408 may be external to and accessible by the transaction processing network computer 400. For example, the account database 408 may be stored at a token vault 218, 228 illustrated in FIG. 2.

According to various embodiments, the transaction processing network computer 400 may also function as a tokenization server computer that generates tokens upon request. For example, when the transaction processing network computer 400 receives a token generation request message from a token requestor (as discussed above in connection with FIG. 2), the transaction processing network computer 400 may generate a token associated with an account identifier included in the token request message. The transaction processing network computer 400 may store a mapping between the generated token and the corresponding account identifier at the account database 408.

In some embodiments, transaction analysis module 402, working with processor 412 of the transaction processing network computer 400, may determine whether the account identified by the account identifying information provided in the token request message is allowed for tokenization (e.g. whether the account may be provisioned on a user device and/or may be used in a transaction). For example, the transaction analysis module 402, in conjunction with the processor 412, may determine whether the account is closed (e.g. deactivated). In such cases, the transaction processing network computer 400 may notify the token requestor that the account has been deactivated and cannot be provisioned (e.g. a token cannot be generated for the account identifier). In some embodiments, the account may be restricted for use in connection with pre-determined types of transactions. For example, the account may be restricted for use with transaction based on transaction location, transaction value, transaction time, etc. In such cases, the transaction analysis module 402 and the processor 412 may inform the token generation module 403 of such restrictions so that restricted use token(s) may be generated for that account.

Transaction analysis module 402, working with processor 412 of the transaction processing network computer 400, may also determine that the account identified by the account identifying information provided in the token request message is a co-network account. For example, the transaction analysis module 402, working with processor 412 of the transaction processing network computer 400, may determine at least one additional transaction processing network associated with the account identifier.

Upon determining that the account is a co-network account, the transaction processing network computer 400 may initiate an authentication process with the user to ensure that the user is the authorized user of the co-network account identified by the account identifier provided in the token request message. For example, the identification and verification module 404 of the transaction processing network computer 400 may perform one or more of identification and verification methods with the user. As part of an ID&V method, the identification and verification module 404 may receive information such as a user signature, a password, an offline or online personal identification number (PIN), an offline or online enciphered PIN, a combination of offline PIN and signature, a combination of offline enciphered PIN and signature, user biometrics (e.g. voice recognition, fingerprint matching, etc.), a pattern, a glyph, knowledge-based challenge-responses, hardware tokens (multiple solution options), one time passwords (OTPs) with limited use, software tokens, two-channel authentication processes (e.g., via phone), etc. The identification and verification module 404 may use the received information to confirm that the token is requested for the intended user of the co-network account.

The token generation module 403 may generate the token in response to the token request message after the identification and verification module 404 confirms that the token is requested for the intended user of the co-network account. The transaction processing network computer 400 may return the generated token to the token requestor via the external communication interface 406.

When a user initiates a transaction with a transacting party, the computer operated by the transacting party generates a transaction authorization request message and sends the transaction authorization request message to the transaction processing network computer 400. The transaction processing network computer 400 may receive the transaction authorization request message via the external communication interface 406. The transaction authorization request message may include, among other information, a token. Upon receiving the transaction authorization request message, the transaction analysis module 402 of the transaction processing network computer 400, working in conjunction with the processor 412, may query the account database 408 to determine the account associated with the token included in the transaction authorization request message.

The transaction processing module 405 and the processor 412 may modify the transaction authorization request message to replace the token with the corresponding account information retrieved from the account database 408. The transaction processing module 405 and the processor 412 may then transmit the modified transaction authorization request message to the authorizing computer system. Upon receiving the transaction authorization request message, the authorizing computer system may process the transaction authorization request message and determine whether the request should be approved or declined. The authorizing computer system may provide a transaction authorization response message to the transaction processing network computer 400. The transaction processing network computer 400 may receive the transaction authorization response message via the external communication interface 406.

In some embodiments, the transaction processing module 405 and the processor 412 of the transaction processing network computer 400 may modify the transaction authorization response message received from the authorizing computer system to replace the account identifier with the token. The transaction processing network computer 400 may send the transaction authorization response message (or the modified transaction authorization response message) to the transacting party.

The transaction processing network computer 400 may also include a system memory 410 comprising one or more modules to generate and utilize electronic messages, and the data processor 412 for facilitating a transaction and the exchange of electronic messages. According to some embodiments, the account database 408 may be stored at the system memory 410.

Embodiments allow for provisioning of a co-network account on a user device. For accounts that are associated with more than one transaction processing network, embodiments allow provisioning multiple tokens based on the identification and verification result (e.g. authentication result) of one of the transaction processing networks. When a first token associated with a first transaction processing network is provisioned on the user device, the subsequent tokens associated with the remaining transaction processing networks may be automatically provisioned using the authentication result of the first transaction processing networks.

The various participants and elements described herein with reference to FIGS. 1-4 may operate one or more computer apparatuses to facilitate the functions described herein. Any of the elements in FIGS. 1-4, including any servers or databases, may use any suitable number of subsystems to facilitate the functions described herein.

Figure 5:
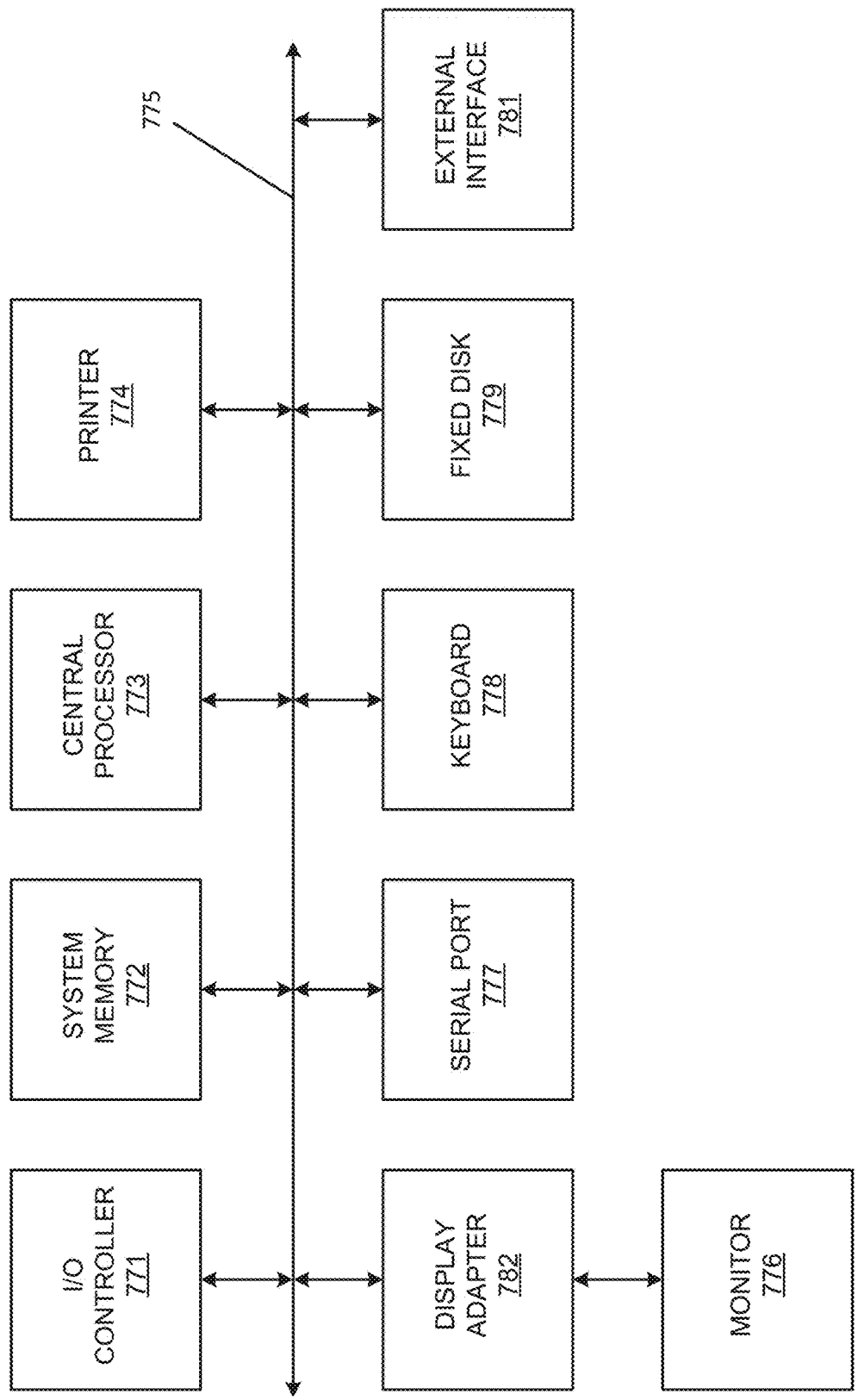
FIG. 5 is a block diagram of a computer apparatus that may be used to implement embodiments disclosed herein, according to an embodiment of the invention.

Examples of such subsystems or components are shown in FIG. 5. The subsystems shown in FIG. 5 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771 (which can be a processor or other suitable controller), can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 777 and/or the fixed disk 779 may embody a computer readable medium.

Embodiments of the invention are not limited to the above-described embodiments. For example, although separate functional blocks are shown for an issuer, payment processing network, and acquirer, some entities perform all of these functions and may be included in embodiments of invention.

Specific details regarding some of the above-described aspects are provided above. The specific details of the specific aspects may be combined in any suitable manner without departing from the spirit and scope of embodiments of the invention. For example, back end processing, data analysis, data collection, and other transactions may all be combined in some embodiments of the invention. However, other embodiments of the invention may be directed to specific embodiments relating to each individual aspect, or specific combinations of these individual aspects.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, at a server computer of a first transaction processing network, a first token provisioning request message from a token requestor, the first token provisioning request message including an account identifier identifying a co-network account managed by the first transaction processing network and a second transaction processing network such that transactions initiated using the account identifier is processed by one of the first transaction processing network or the second transaction processing network;
determining, by the server computer of the first transaction processing network, the second transaction processing network associated with the account identifier;
performing, by the server computer of the first transaction processing network, an authentication process with a user;
generating, by the server computer of the first transaction processing network, a first token associated with the account identifier; and sending, by the server computer of the first transaction processing network, the first token and result of the authentication process to the token requestor, wherein the token requestor sends a second token provisioning message including the account identifier and the result of the authentication process performed by the server computer of the first transaction processing network to the second transaction processing network to request a second token for the account identifier, wherein, the second transaction processing network generates the second token based on the first token and the result of the authentication process, the first token and the second token are associated with the account identifier, and the first token and the second token are provisioned on a user device of the user.

2. The method of claim 1, further comprising:
upon determining the second transaction processing network, informing, by the server computer of the first transaction processing network, the token requestor about the second transaction processing network.

3. The method of claim 1, further comprising:
sending, by the server computer of the first transaction processing network, a provisioning request message to an authorizing computer to request authorization prior to generating the first token.

4. The method of claim 3, wherein the provisioning request message includes the account identifier and the result of the authentication process.

5. The method of claim 1, further comprising:
determining, by the server computer of the first transaction processing network and prior to generating the first token, that the co-network account identified by the account identifier is eligible for provisioning.

6. The method of claim 1, wherein the authentication process is performed based on the determining the second transaction processing network associated with the account identifier.

7. The method of claim 1, wherein the first token or the second token is used to access a building or data in a database.

8. A method comprising:
sending, by a token requestor computer, a first token request message to a first transaction processing network, wherein the first token request message includes an account identifier identifying a co-network account managed by the first transaction processing network and a second transaction processing network such that transactions initiated using the account identifier is processed by one of the first transaction processing network or the second transaction processing network;
receiving, by the token requestor computer, a message from the first transaction processing network indicating that the account identifier is associated with the second transaction processing network;
receiving, by the token requestor computer, a first token from the first transaction processing network;
sending, by the token requestor computer, a second token request message to the second transaction processing network, wherein the second token request message includes the account identifier, the first token and a result of an authentication process performed by the first transaction processing network, wherein the second transaction processing network generates a second token based on the first token and the result of the authentication process; and
receiving, by the token requestor computer, the second token from the second transaction processing network, wherein the first token and the second token are provisioned on a user device of a user of the co-network account associated with the account identifier.

9. The method of claim 8, further comprising:
receiving, by the token requestor computer, the result of the authentication process performed by the first transaction processing network.

10. The method of claim 8, further comprising:
receiving, by the token requestor computer, the account identifier from the user of the co-network account associated with the account identifier prior to sending the first token request message.

11. A server computer of a first transaction processing network, comprising:
   one or more processors; and
   a non-transitory computer readable storage medium communicatively coupled with the one or more processors and storing instructions which, when executed by the one or more processors, cause the server computer to:
   receive a token provisioning request message from a token requestor, the token provisioning request message including an account identifier identifying a co-network account managed by the first transaction processing network and a second transaction processing network such that transactions initiated using the account identifier is processed by one of the first transaction processing network or the second transaction processing network;
   determine the second transaction processing network associated with the account identifier;
   perform an authentication process with a user based on the determining the second transaction processing network associated with the account identifier;
   generate a first token associated with the account identifier; and
   send the first token and result of the authentication process performed by the server computer of the first transaction processing network to the token requestor, wherein the token requestor requests a second token for the account identifier from the second transaction processing network associated with the account identifier, wherein the second transaction processing network generates the second token based on the first token and the result of the authentication process, the first token and the second token are associated with the account identifier, and the first token and the second token are provisioned on a user device of the user.

12. The server computer of claim 11, wherein the instructions, when executed by the one or more processors, further cause the server computer to:
   upon determining the second transaction processing network, inform the token requestor of the second transaction processing network.

13. The server computer of claim 11, wherein the instructions, when executed by the one or more processors, further cause the server computer to:
   send a provisioning request message to an authorizing computer to request authorization prior to generating the first token.

14. The server computer of claim 13, wherein the provisioning request message includes the account identifier and the result of the authentication process.

15. The server computer of claim 11, wherein the instructions, when executed by the one or more processors, further cause the server computer to:
   determine, prior to generating the first token, that the co-network account identified by the account identifier is eligible for provisioning.

* * * * *